(12) United States Patent
Sun

(10) Patent No.: US 6,800,700 B2
(45) Date of Patent: Oct. 5, 2004

(54) POLYMERIZATIONS USING ADJUVANT CATALYSTS

(75) Inventor: Lixin Sun, Odessa, TX (US)

(73) Assignee: Huntsman Polymers Corporation, Odessa, TX (US)

(*) Notice: Subject to any disclaimer, the term of this patent is extended or adjusted under 35 U.S.C. 154(b) by 0 days.

(21) Appl. No.: 10/325,232

(22) Filed: Dec. 19, 2002

(65) Prior Publication Data

US 2003/0134990 A1 Jul. 17, 2003

Related U.S. Application Data

(63) Continuation-in-part of application No. 09/860,051, filed on May 17, 2001, now abandoned, which is a continuation-in-part of application No. 09/273,162, filed on Mar. 19, 1999, now abandoned.
(60) Provisional application No. 60/084,558, filed on May 6, 1998.

(51) Int. Cl.$^7$ .............................. C08F 4/44; C08F 4/642

(52) U.S. Cl. ..................... 526/114; 526/74; 526/113; 526/118; 526/119; 526/201; 525/191; 525/240

(58) Field of Search ..................... 526/74, 113, 114, 526/118, 119, 201; 525/191, 240

(56) References Cited

U.S. PATENT DOCUMENTS 5,539,056 A * 7/1996 Yang et al. .................. 525/240

* cited by examiner

*Primary Examiner*—Roberto Rabago
(74) *Attorney, Agent, or Firm*—Christopher J. Whewell

(57) ABSTRACT

Disclosed herein are methods for producing polymeric materials which are normally tenacious in their character to such degree that their processing by conventional means is not possible, for example substantially-amorphous polyolefins. By introducing a second catalyst capable of producing a powdery polymer into the polymerization system during production of the sticky polymers, these normally sticky, tenacious polymers are rendered into a form which may be processed using conventional means and equipment.

6 Claims, No Drawings

POLYMERIZATIONS USING ADJUVANT CATALYSTS

CROSS REFERENCES TO RELATED APPLICATIONS

This application is a Continuation-In-Part of previous application Ser. No. 09/860,051 filed May 17, 2001, now abandoned which was a Continuation-In-Part of application Ser. No. 09/273,162 filed Mar. 19, 1999, now abandoned, and claims benefit of U.S. Provisional Application No. 60/084,558 filed May 6, 1998. The entire contents of each of these applications are herein incorporated by reference thereto.

TECHNICAL FIELD

This invention relates generally to a method for producing low-crystallinity polyolefins. The invention relates more particularly to the production of sticky, substantially amorphous polyolefins that normally adhere to the walls of the reactor in which they are produced to such degree that such polyolefins are considered by those skilled in the art as being difficult to manufacture and process in conventional polyolefin manufacturing processes in commercially-significant quantities. The invention relates further to processes useful for rendering such sticky, substantially amorphous polyolefins processable using conventional polyolefin manufacturing equipment.

BACKGROUND INFORMATION

The polymerization of various olefins, including propylene, ethylene, and the like has been known in the chemical arts for some time. Generally speaking, in order to polymerize an olefin, one provides the olefin to be polymerized and contacts the olefin (monomer) with a catalytic material, which may include a co-catalyst, as the use of such is well-known in the art, under sufficient conditions of temperature and pressure to cause polymerization of the monomer to form a polymeric product. The conditions of temperature and pressure of the polymerization reaction may be varied, as well as the monomer(s) and catalyst(s) used and type of reaction vessel in which the polymerization is carried out. Also, hydrogen may be introduced during the polymerization to control the molecular weight of the polymer, and the use of hydrogen in this regard is well-known in the art.

One process for polymerization of olefins including, but not limited to propylene is known as the slurry process. In the slurry process, an inert organic solvent is fed into a closed reaction vessel and typically heated, with stirring. Then, a monomeric raw material is fed into the reaction vessel wherein some of the monomer dissolves in the solvent. Catalyst is fed to the stirred reactor and the monomer becomes polymerized. Polymer and solvent may be removed as a slurry (provided that the polymer, by its very nature, has no tendency to stick to the reactor walls) through a pipe in one of the sides or bottom of the reactor. The polymer is then separated from the solvent using means well known to those skilled in the polymer art, and the solvent is recycled. The process may be conducted as a batch process, and the monomer itself may function as the solvent, as in the case when propylene is employed under conditions in which it exists in the liquid state.

Another process useful for polymerizing olefins that is well-known to those skilled in the art is referred to as the "liquid pool" process, in which the solvent is an olefin which is to be polymerized in the polymerization. In such a process, the monomeric material (liquid propylene or other liquid alkene) and catalyst are fed into the reactor, which may be a stirred autoclave, and caused to polymerize by introducing catalyst (and co-catalyst if desired) under selected conditions of temperature, pressure, and added hydrogen.

Amorphous and low-crystallinity polyolefins are commercially important for their use in diverse products due to the unique combination of chemical and physical properties they possess, including chemical inertness, softness, flexibility, recyclability. Industrial interest in these materials has increased in recent times by the development of catalysts to produce them, as taught specifically in U.S. Pat. No. 5,948,720.

A number of patents disclose catalysts and processes to prepare amorphous or elastomeric polyolefins, including U.S. Pat. Nos. 4,524,195; 4,736,002; 4,971,936; 4,335,225; 5,118,768; 5,247,032; 5,539,056; 5,565,532; 5,608,018; 5,594,080; 5,948,720; 6,080,819; and 6,100,351, as well as European Patents EP 604908 and 693506, the entire contents of all aforesaid patents being herein incorporated by reference thereto. Several types of organometallic catalysts are useful to produce polyolefins and are conventionally referred to as "Ziegler-Natta" catalysts, metallocene catalysts and non-metallocene single-site catalysts. Catalysts known as "Ziegler-Natta" catalysts are well-known in the art to comprise a mixture of a base metal alkyl of the group I to III metals, and a transition metal salt of groups IV to VIII metals of the periodic table of the elements. A Ziegler-Natta catalyst is basically a complex derived from a halide of a transition metal, for example, titanium, chromium or vanadium with a metal metal alkyl that is typically an organoaluminum compound. The catalyst is usually comprised of a titanium halide supported on a magnesium compound. Metallocene catalysts are well-known to those skilled in the art to include in its structure two cyclopentadienyl ligands coordinated to a transition metal. Metallocene catalysts are known to be one type of "single-site" catalysts in which all the catalytically active sites are uniform in nature. Polymer produced by a single-site catalyst can have Mw/Mn value approaching 2, wherein Mw is the weight average molecular weight and Mn is the number average molecular weight of polymer. Non-metallocene single-site catalysts refer to all the single-site catalysts which do not have in their structure two cyclopentadienyl ligands coordinated to a transition metal. For purposes of this specification and the appended claims, the words "substantially amorphous" when referring to polyolefins means those having less than about 70 Joules per gram of crystallinity as measured using Differential Scanning Calorimetry according to ASTM method D-3417.

While the production of various amorphous and low-crystallinity polyolefins is possible owing to the relatively recent development of several catalysts therefor, it has been an ongoing problem in this art nevertheless that the harvest of these amorphous polyolefins from a reactor operated in liquid pool slurry processes has been thus far extremely difficult and in some cases even impossible to carry out on a commercial scale. This is because these sticky polymers typically tend to agglomerate on the walls and other portions of the reactor in which they are produced, thus fouling the reactor and other plant equipment. Among other complications caused by coatings of polymer on the walls of a reactor is that heat transfer capability between the walls of the vessel and the contents of the vessel is greatly reduced, which results in a reduced degree of control of the reaction conditions by the process operator. Such a loss of control of reaction temperature can have devastating consequences on the condition of the reactor, as well as the physical properties of the polymer products produced therein. Typically, to remove fouled material it is necessary to open the reactor and mechanically scrape the walls of the reaction vessel. Production of such "fouling" material is therefore viewed by those skilled in the art as being greatly undesirable, regardless of the properties of the polymeric materials so produced. This translates to a reduced overall potential for merchants of commerce to benefit the public by supplying polymers having hitherto unobserved and particularly useful physical properties. As used in this specification and the appended claims the words "fouling polymer" means a polyolefin polymer which adheres to the walls of the reactor in which it is produced to such an extent that commercial production of the polymer is hindered by reactor maintenance and cleansing requirements extraordinary with respect to those normally required for producing polymers which do not substantially adhere to the walls of the reactor in which they are produced, either in technique or frequency.

World Patents 96/11963 and 96/16996 describe solution processes for producing amorphous polyolefins. However, the processes therein set forth have the disadvantages of limitations on the viscosity and solids content, and include the use of one or more solvents, thus necessitating provisions for solvent recovery.

SUMMARY OF THE INVENTION

The present invention relates to a liquid pool process for polymerizing propylene, which process employs a first catalyst that produces a substantially-amorphous, fouling, first propylene polymer that is at least 90% insoluble in liquid propylene based on the total mass of the polymer, and has a weight-average molecular weight of any value in the range of between 10,000 and 2,000,000, including every weight-average molecular weight therebetween. According to a process of the invention, there is present in the polymerization reactor a second catalyst that produces a second propylene polymer that is at least 90% insoluble in liquid propylene based on the total mass of the polymer and that exists in the form of a powder from the time of its formation. The second polymer is produced simultaneously with the first propylene polymer and is made in an effective amount sufficient to provide a coating of the second polymer powder about the fouling first propylene polymer during the formation of the first polymer. The second polymer coats the first polymer sufficiently to effectively eliminate or substantially reduce the tendency of the first polymer to adhere to the walls of the polymerization reactor. Thus, a process according to the invention yields a propylene polymer product predominantly exhibiting the beneficial physical properties of the first propylene polymer while existing in a physical form that may be readily handled, transported, manipulated, and processed by those in the polymer-product manufacturing industries using conventional equipment.

DETAILED DESCRIPTION OF THE INVENTION

In accordance with the foregoing disadvantages associated with catalysts and processes in the prior art which tend to produce polymers that substantially adhere to the walls of the vessel in which they are produced using a slurry process, it is an object of the instant invention to provide a method whereby amorphous polymers which are sticky and tenacious enough to normally adhere to reactor walls are caused to be inert with respect to such adhesion.

The reactor fouling caused by agglomeration of sticky, amorphous polymer is eliminated or reduced in accordance with the instant invention by introduction of an effective anti-fouling amount of fine polymer powder dispersed in the reaction medium. The polymer powder is believed to coat the surface of the sticky, amorphous polymer particles to produce a less sticky surface having a reduced tendency to adhere to the reactor wall. In order to be effective towards this end, the powder must be of a small particle size, and be a non-sticky, free-flowing powder itself when in the dry state. The polymer powder is preferably an olefin polymer powder, although literally any other polymeric material which exists in a free-flowing powdery state having an average particle size of less than about 100 microns when dry, and which is capable of adhering to an amorphous sticky polymer as it is formed may be used, provided the polymer powder does not interfere with the polymerization of the sticky amorphous olefin nor significantly influence the physical properties of the sticky amorphous polymer in an adverse way. According to a preferred process according to the invention, the amorphous polymer has a weight-average molecular weight in the range of 10,000 and 2,000,000, including every weight-average molecular weight therebetween, and wherein said polymer powder comprises a polymer selected from the group consisting of polyethylene, polypropylene, polybutylene, polystyrene, and copolymers of any of the foregoing with a $C_{2-C8}$ alkene.

Since the desired polymers made in accordance with the invention are olefin polymers which are, by their nature, thermoplastic polyolefins, it is further desirable that a powdery polymer used to make the sticky, amorphous polymers non-adherent to reactor equipment also be of a thermoplastic nature, in order to not give rise to problems during processing owing to inhomogeneity of the polymer melt.

It is well-known to those skilled in the art that catalysts used to produce commercial isotactic polypropylene do not produce a powder as herein defined, but rather form larger "granules" of polymer product, for which the processing equipment is designed to manipulate. Granules are particles which have diameters of about 100 microns to about 3000 microns, with a diameter of about 300–1500 microns being most common. Particles which have diameters of about 100 microns or less are commonly referred to as "fines" by those skilled in the art of polymer manufacture. Polypropylene fines pose a nuisance to manufacture of polymer granules, and the production of these fines is desirably kept to an absolute minimum during polymer manufacture. However, the powdery polymer produced in accordance with the present invention qualifies as "fines". Thus, according to the present invention, a polymer having a particle size which is undesirable (i.e., the powdery polymer) is used for an advantageous purpose. According to the present invention, a material that was recognized as being undesirable is purposefully made and used to advantage to achieve a new function. Although the powdery polymer discussed herein may be added to the reaction mixture during polymerization of the sticky, amorphous polymer in the form of a suspension in an inert solvent, it is most preferred that the powdery polymer be formed in situ during the polymerization of the sticky, tenacious, amorphous olefin polymer by the inclusion of a second catalyst in addition to the catalyst used to produce the amorphous material.

Thus, in a preferred form, the present invention is an improvement in a process for olefin polymerization which employs a first catalyst for producing a substantially amorphous, fouling polymer, wherein the improvement comprises: the presence in the polymerization reactor of an effective amount of a second catalyst which produces polyolefin powder simultaneously with said first catalyst to provide a powder polymer coating of the amorphous polymer during amorphous polymer formation so as to eliminate or substantially reduce the tendency of solid amorphous polymer to adhere to the walls (i.e., "fouling") of the polymerization reactor. For purposes of this specification and the appended claims, the word "sticky" when used referring to a polymer means that the polymer exhibits agglomeration and adheres to the walls of the reactor in which it is formed.

Preferably, the powder is a polymer which is produced in-situ, in the reactor in which the polymerization of the olefin is carried out. This is preferably accomplished in accordance with this invention by the introduction of a special catalyst component which produces the desired powdery polymer without adversely affecting the performance of the main catalyst used for the olefin polymerization. Thus, in a preferred form the instant invention comprises a mixed catalyst system which produces two different polymers from the same monomeric raw material—the main sticky polymer, produced by the main catalyst; and the powdery polymer (which reduces the affinity of the main sticky polymer for the reactor walls) produced using the adjuvant catalyst.

The present invention is readily distinguishable from many prior art processes, such as those of the type taught in U.S. Pat. No. 6,080,819 in which the amorphous polymer is soluble in the solvent used, in such case toluene, and the isotactic polymer is insoluble in the solvent. In the present invention, on the other hand, both the substantially amorphous and the isotactic polymers are at least 90% insoluble, based on their weight, in the monomer propylene, used in one preferred embodiment as the sole liquid pool medium. In systems in which the amorphous polymer is soluble in a solvent which is present, it is not possible for the presence of powdery polymer producing second catalyst to provide a coating on the particles of the amorphous polymer, since the amorphous polymer does not exist in particulate form that is capable of being coated owing to its solubility in the solvent. In the present invention, both the amorphous, fouling polymer and the powdery polymer are insoluble in the reaction medium to a degree of at least 90% based on their total mass, wherein the solvent may be any hydrocarbon having between 2 and 20 carbon atoms in its molecular structure (including 2 and 20), whether straight-chain, branched, saturated, or unsaturated, and is preferably a liquid substance selected from ethylene, propylene, or butylene and which may optionally be a mixture of two or more such hydrocarbons, but is most preferably composed predominantly of liquid propylene.

A process of the present invention is also substantially different from the teachings of prior art such as U.S. Pat. No. 5,539,056 which teaches polymer compositions made using two catalysts. The catalysts used to produce the compositions of the prior art have very different activity and the resulting polymers have different molecular weights and melting points, which is clear from the writings of M. Galimberti et al., "Polyolefin Elastomers from Metallocenes", presented in MetCon '94, May 25–27, 1994, Houston, Tex. All of these differences in physical properties affect the morphology of polymer formed.

The examples below are illustrative, but not delimiting, of the process of this invention. They show how the catalytic material Dimethylsilylbis(1-indenyl) zirconium dichloride functions to produce powdery polymers in accordance with this invention, simultaneously with other catalysts which produce sticky, amorphous polypropylenes. The effect of the catalyst which produces powdery polymers is to render the amorphous, sticky polymers inert with respect to adhesion to the walls of the reactor. For purposes of this specification and the appended claims, the word "powder" means a polymer which exists in a particulate form comprising a plurality of particles immediately upon its being produced in a reactor from at least one monomeric raw material, wherein the average size of the particles is below about 100 microns. According to one preferred form of the invention, the particle size of the powder is any micron size between 1 and 100 microns, including mixtures of particle within this range which have different particle sizes within this range. Preferably, the average particle size is less than about 50 microns, more preferably, less than 40 microns, and most preferably, the average size of the particles is less than about 30 microns. In one preferred embodiment, the catalyst used to produce the powdery polymer is selected from the group consisting of: rac-ethylenebis(1-indenyl)zirconium dichloride and Dimethylsilylbis(1-indenyl)zirconiumdichloride. In one preferred embodiment, the polymerizations of the present invention are carried out at a temperature in the range of between 40 degrees centigrade and 60 degrees centigrade.

EXAMPLE 1

Preparation of Fine Powder Polymer

A one-liter autoclave reactor equipped with a mechanical stirrer was purged with dry nitrogen and then with propylene in order to flush out residual atmospheric components. Then, 1.0 milligram of Dimethylsilylbis(1-indenyl) zirconium dichloride and 4.45 millimoles of modified methylaluminoxane (MMAO-4 from Akzo Chemicals Inc. of 300 S. Riverside Plaza, Chicago, Ill. 60606) were charged into the reactor, followed by the addition of 330 grams of liquid propylene. The reactor was heated and maintained at 50 degrees Centigrade for one hour under a fair amount of, but not vigorous, agitation. After venting off the unreacted monomer, 112 grams of crystalline fine polypropylene powder was recovered.

EXAMPLE 2

The same polymerization procedure as described in Example 1 was employed. 1.0 mg of Dimethylsilylbis(2-methyl-4-phenylindenyl)zirconium dichloride and 3.78 millimoles of modified methaluminoxane were charged into the reactor, followed by the addition of 330 grams of liquid polypropylene. The reactor was heated and maintained at 50 degrees centigrade for one hour under agitation. After venting off the unreacted monomer, 58 grams of crystalline polypropylene was obtained. The polymeric product, however, did not have particle form and came out of the bench-scale reactor in the form of a single large chunk.

EXAMPLE 3

Preparation of Amorphous Polypropylene (Sticky in Reactor)

The same polymerization procedure as described in Example 1 was employed. 1.5 milligrams (mg) of (Tetramethylcyclopentadienyl-1-dimethylsilyl-t-butylamido) titanium was added to the reactor, followed by the addition of 330 grams of liquid propylene. The temperature of the reactor was maintained at 50 degrees centigrade for one hour. Visual observation through a sightglass in the reactor showed that the polymer formed had no particle form in the reaction medium and appeared to be gummy, semi-transparent, and stuck on the sightglass.

EXAMPLE 4

"Sticky" Amorphous Polypropylene Made "Non-sticky" in Reactor with Powdery Polymer The same polymerization procedure as described in Example 3 was employed. 1.2 milligrams (mg) of (Tetramethylcyclopentadienyl-1-dimethylsilyl-t-butylamido)titanium dichloride and 0.3 mg of Dimethylsilylbis(1-indenyl) zirconium dichloride and 5.6 millimoles of MMAO (AKZO MMAO-4) were added to the reactor, followed by the addition of 330 grams of liquid propylene. The temperature of the reactor was maintained at 50 degrees centigrade for one hour. Visual observation through a sightglass in the reactor showed that the reaction medium appeared milky and contained a large amount of fine white particles as well as some larger (1–2 mm) white particles. Upon stopping the agitation, all particles fell down to the bottom and no polymer stuck to the window or the walls. None of the polymer was observed to be sticking to the sightglass or the reactor walls. It was clear that the presence of the Dimethylsilylbis (1-indenyl) zirconium dichloride and the MMAO had permitted production of the other sticky polymer without any of the latter becoming fouled on the reactor walls.

EXAMPLE 5

The same polymerization as in Example 3 was carried out using identical conditions except that 1.4 mg of (Tetramethylcyclopentadienyl-1-dimethylsilyl-t-butylamido) titanium dichloride and 0.1 mg of Dimethylsilylbis(1-indenyl)zirconium dichloride were employed.

EXAMPLE 6

The same polymerization as in Example 3 was carried out using identical conditions except that 1.45 mg of (Tetramethylcyclopentadienyl-1-dimethylsilyl-t-butylamido) titanium dichloride and 0.05 mg of Dimethylsilylbis(1-indenyl)zirconium dichloride were employed.

EXAMPLE 7

The same polymerization conditions as in Example 3 were employed using identical conditions except that 4.0 mg of Dimethylsilylbis (9-fluorenyl)zirconium, 0.3 mg of Dimethylsilylbis(1-indenyl)zirconium dichloride and 8.5 millimoles of MMAO-4 were employed as catalysts for propylene polymerization. The observation was the same as for Example 4—the reaction mixture was composed of tiny white particles and larger irregularly-shaped particles, which were well dispersed in the medium and not sticking to the walls of the reactor.

EXAMPLE 8

The same polymerization as in Example 7 was carried out using identical conditions except that the Dimethylsilylbis (1-indenyl)zirconium chloride was omitted. The polymer produced had no evidence of a particulant nature present, appeared to be gummy, was semi-transparent and adhered strongly to the walls of the reactor.

EXAMPLE 9

The same polymerization procedure as described in Example 3 was employed. 1.0 milligrams (mg) of (Tetramethylcyclopentadienyl-1-dimethylsilyl-t-butylamido)titanium dichloride and 0.5 mg of Dimethylsilylbis(2-methyl-4-phenylindenyl)zirconium dichloride and 5.6 millimoles of MMAO (AKZO MMAO-4) were added to the reactor, followed by the addition of 330 grams of liquid propylene. The temperature of the reactor was maintained at 50 degrees centigrade for one hour. Visual observation through a sightglass in the reactor showed that the polymer formed had no fine-particle form in the reaction medium and appeared to be sticking to the sightglass and the shaft of the agitator. After venting off the unreacted monomer, the polymeric product was so tough and strongly adhered to the reactor wall that it took a tremendous effort to scrape it out.

In Example 1 a fine powdery polymer was prepared using the catalyst stated therein. The polymer product existed in the form of a powder having an average particle size of about 30 microns, and after removal of all the unreacted monomer the polymer particles were free-flowing, and reminiscent in size of talcum powder or "baby powder" particles.

Example 2 shows a comparative result using another isospecific metallocene catalyst. Although it also made high crystallinity polymer as in Example 1, the polymer product was not powdery in the reaction medium, so it does not function as a fouling-preventative agent, such as is later illustrated in Example 9.

In Example 3 is taught the preparation of a mass of sticky, amorphous polypropylene using a constrained geometry catalyst, which was disclosed in U.S. Pat. No. 5,272,236. Although the polymer produced by this process may have beneficial properties making it especially well-suited in particular end use applications where amorphous polyolefins are desirable, its overall stickiness and tendency to adhere to the walls of the reactor again makes the recovery and further processibility of such a polymer extremely difficult from a practicality standpoint.

In Example 4 is taught a process in accordance with the invention in which the amorphous polypropylene polymer from Example 3 is transformed to apparently non-sticky particles in reaction medium by the inclusion in the polymerization reactor of a catalyst which produces a powdery polymer. In this example, reactor fouling is prevented as none of the polymer stuck to the reactor walls.

Examples 5 and 6 illustrate the effect of the ratio of amorphous polymer to powdery polymer. It was observed in Examples 5 and 6 that as the amount of Dimethylsilylbis (1-indenyl)zirconium was reduced, the reaction medium became less milky, indicating the presence of fewer particles of powdery polymer. This change was attended by an increase in the size of the particles of amorphous polymer present. This establishes the relationship between the presence of the catalyst which produces powdery polymer and the tendency for the amorphous material simultaneously produced to stick to the reactor walls.

Examples 7 and 8 illustrate the invention using another amorphous polymer-producing catalyst. The amorphous polypropylene polymer (Example 8) is transformed to apparently non-sticky particles in reaction medium by the inclusion of a catalyst which produces a powdery polymer in the polymerization reactor (Example 7).

Example 9 illustrates the use of a second isospecific catalyst which produces non-powdery crystalline polymer. Since the polymer produced does not have fine particle form, it cannot prevent the amorphous polymer from sticking to the reactor wall, and a tenacious messy mass of polymer was produced.

Comparing the results of Example 4 with Example 9, it is seen that while both processes are carried out using as unsupported catalysts, both a tetramethyl Cp "constrained geometry" titanium dichloride catalyst; and a dimethylsilyl-bridged zirconium dichloride with indenyl-type ligands, along with an aluminoxane cocatalyst, the results of each of the polymerizations are quite different. In the case of Example 4, the adjuvant catalyst (used in Example 1) produced a powder product having a 30 micron average particle size, while in the case of Example 9, the adjuvant catalyst (used in Example 2) produced non-powdery polymer material. Thus, while Example 9 uses the same general polymerization conditions (i.e., propylene monomer, aluminoxane cocatalyst, similar temperature, similar ratio of catalysts, etc.) as were used in Example 4, entirely different results were obtained in each case, and reactor fouling was prevented in Example 4, but not Example 9.

There will always be a minimum preferred amount of powder-producing catalyst which is to be added to a given system in order to confer operability on the system, i.e., the ability of the system to produce continuously and in large quantity what would otherwise be a fouling polymer. As far as determining what the preferred relative amount of powder-producing catalyst to main polymer-producing catalyst present in the reactor is, the relative activity of the powder-producing catalyst as compared to that of the sticky polymer-producing catalyst is a factor. As the activity of the powder-producing polymer increases, the amount necessary for conferring operability to the system decreases. The ratio of powdery polymer to sticky polymer is important. This is dependent on the degree of stickiness of the sticky polymer. The more sticky the sticky polymer, the more powdery polymer will be required.

Typically, it is desired that the powdery polymer is produced in an amount equal to between about 1% and 60% of that of the total polymer produced in the presence of both types of catalysts. More preferably, the powdery polymer constitutes between about 3 and 40 (and every whole integer therebetween) percent of the total polymer produced. Generally speaking, the operability of a two catalyst system as disclosed herein increases as the amount of powder present increases. As long as the powdery polymer does not adversely affect the desired properties of the sticky polymer, any level of powdery polymer which is effective for producing sticky polymers without reactor fouling is satisfactory for achieving the objects of conferring operability to an otherwise fouled system.

One goal which is notably achieved by the process of the present invention is the rendering of sticky amorphous polymers into a form which may be readily processed using conventional manufacturing equipment. It is well-known in the art that while it is possible to produce a wide variety of polymers, not all are harvestable in continuous manner from industrial-scale manufacturing reactors owing to their inherent tenacity. This problem is discussed in detail in U.S. Pat. Nos. 5,948,447 and 6,143,842, both of which are herein incorporated by reference thereto. Each of these patents describe processes and non-conventional, inventive apparati for harvesting tenacious polymers, illustrating the fact that in many cases conventional processing equipment is unsuitable for amorphous polyolefins. One advantage of the present invention is that specialized equipment as described in the aforementioned patents may be rendered unnecessary in the case of many polymers by the teachings of the present invention. Such advantage not only saves money on capital investments, but also saves downtime associated with upgrading or altering a manufacturing plant to accommodate such equipment.

Although preferred embodiments of the invention have been described in the foregoing description, it must be borne in mind that the present invention is not limited to the specific embodiments disclosed herein, but is capable of numerous modifications by one of ordinary skill in the art after their reading and understanding this specification and the appended claims. Thus, it is understandable that the materials used and the chemical details may be slightly different or modified from the descriptions set forth herein without departing from the methods and compositions disclosed and taught by the present invention.

What is claimed is:

1. In a liquid pool process for polymerizing propylene, which process employs a first catalyst that produces a substantially-amorphous, fouling, first propylene polymer that is insoluble in liquid propylene and has any weight-average molecular weight in the range between 10,000 and 2,000,000, including every weight-average molecular weight therebetween, wherein the improvement comprises: the presence in the polymerization reactor of a second catalyst that produces a second propylene polymer that is insoluble in liquid propylene and that exists in th form of a powder, simultaneously with the first propylene polymer and in an effective amount sufficient to provide a coating of the second polymer powder about the fouling first propylene polymer during the formation of the first polymer that is effective to eliminate or substantially reduce the tendency of the first polymer to adhere to the walls of the polymerization reactor, thus yielding a propylene polymer product predominantly exhibiting the beneficial physical properties of the first propylene polymer while existing in a physical form that may be readily handled, and processed by those in the polymer-product manufacturing industries using conventional equipment, wherein said second catalyst is selected from the group consisting of: Rac-ethylenebis(1-indenyl) zirconium dichloride and Dimethylsilylbis(1-indenyl) zirconiumdichloride.

2. A process for preventing a sticky amorphous polymer from adhering to the walls in a reactor in which it is formed which comprises: causing an effective anti-adhering amount of a polymer powder to exist in the reactor in which said amorphous polymer is formed during its polymerization wherein said polymer powder is caused to enter said reactor as a suspension in a solvent, which solvent is not detrimental to the polymerization of said amorphous polymer.

3. A process according to claim 2 wherein said amorphous polymer has a weight-average molecular weight in the range of 10,000 and 2,000,000, including every weight-average molecular weight therebetween, and wherein said polymer powder comprises a polymer selected from the group consisting of: polyethylene, polypropylene, polybutylene, polystyrene, and copolymers of any of the foregoing with a $C_{2-C8}$ alkene.

4. A process for preventing a sticky amorphous polymer from adhering to the walls in a reactor in which it is formed which comprises: causing an effective anti-adhering amount of a polymer powder to exist in the reactor in which said amorphous polymer is formed during its polymerization wherein said polymer powder is caused to enter said reactor as a suspension in a solvent, which solvent is not detrimental to the polymerization of said amorphous polymer, in which said solvent is any hydrocarbon having between 2 and 20 carbon atoms in its molecular structure (including 2 and 20), whether straight-chain, branched, saturated, or unsaturated.

5. A process according to claim 3 wherein said powder has an average particle size of less than 50 microns.

6. A process according to claim 3 wherein said powder has an average particle size of less than 40 microns.

* * * * *